H. R. DARLING.
TRIPOD SOCKET FOR CAMERA BEDS.
APPLICATION FILED MAY 5, 1913.
1,112,525.
Patented Oct. 6, 1914.
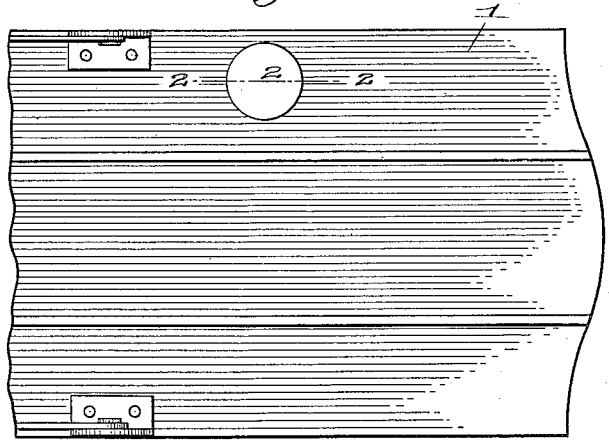
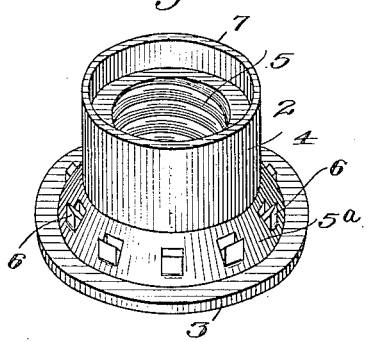
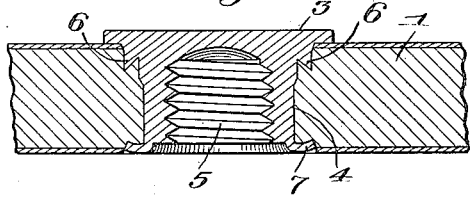
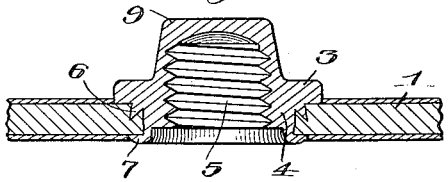
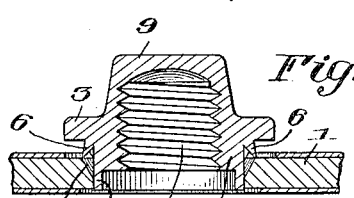
Inventor
Harry R. Darling
Witnesses
By
his Attorneys

UNITED STATES PATENT OFFICE.

HARRY R. DARLING, OF ROCHESTER, NEW YORK, ASSIGNOR TO EASTMAN KODAK COMPANY, OF ROCHESTER, NEW YORK, A CORPORATION OF NEW YORK.

TRIPOD-SOCKET FOR CAMERA-BEDS.

1,112,525. Specification of Letters Patent. Patented Oct. 6, 1914.

Application filed May 5, 1913. Serial No. 765,481.

*To all whom it may concern:*

Be it known that I, HARRY R. DARLING, of Rochester, in the county of Monroe and State of New York, have invented certain new and useful Improvements in Tripod-Sockets for Camera-Beds; and I do hereby declare the following to be a full, clear, and exact description of the same, reference being had to the accompanying drawings, forming a part of this specification, and to the reference-numerals marked thereon.

My present invention relates to photography and more particularly to photographic cameras, and it has for its object to provide an improved construction of socket piece for the camera bed such as is furnished to receive the securing bolt of the tripod to hold the camera on the latter, which socket piece will be simple in construction and capable of being easily and cheaply manufactured as well as being capable of being attached to the bed by a simple operation but in an effective manner whereby its liability to work loose as a result of the strains exerted in frequently applying the camera to the tripod and removing it therefrom will be reduced to a minimum.

To these and other ends the invention consists in certain improvements and combinations of parts all as will be hereinafter more fully described, the novel features being pointed out in the claims at the end of the specification.

In the drawings Figure 1 is a fragmentary top plan view of a camera bed provided with a tripod socket constructed in accordance with and illustrating one embodiment of my invention; Fig. 2 is a section taken substantially on the line 2—2 of Fig. 1; Fig. 3 is a detail perspective view of the socket piece before it is applied to the bed; Fig. 4 is a sectional view corresponding to Fig. 2 of a slightly modified form of socket piece that I prefer to employ in connection with the relatively thin sheet metal camera beds, Figs. 1, 2 and 3 showing the socket for a relatively thick wooden bed, and Fig. 5 is a view corresponding to Fig. 4 but showing the manner in which the socket piece is applied to the bed before being fastened in place.

Similar reference numerals throughout the several figures indicate the same parts.

Socket pieces of the nature involved in this invention are sometimes applied to the main bed or body of the camera and sometimes to the extension bed or door, and while I have illustrated it in the latter position, it will be understood that either place or any convenient or desired wall of the camera structure may carry it.

The bed is indicated at 1 and the socket piece is indicated generally by reference numeral 2. It comprises a flanged head 3 and an intermediate body portion 4, the former being adapted to bear against the inner or upper surface of the bed, as clearly shown in Fig. 2, and the latter to extend through the bed which is suitably bored to receive it. The body portion is interiorly threaded, as indicated at 5, the recess being closed at one end by the head 3 and open at the other outer end on the under side of the bed to receive the tripod bolt. In the region of the junction of the body portion 4 with the head 3, a flared or conical portion $5^a$ is provided on which are formed a plurality of outstanding spurs 6 located laterally of the body portion and preferably pointing substantially longitudinally thereof. These spurs are preferably created by striking them up with a sharp tool from the surface of the portion $5^a$ and are themselves sharply pointed. At the opposite and outer or lower end, the body portion is provided with an annular collar 7 of much reduced thickness from that of the remainder of the said portion from which it is, in effect, extended.

In applying the socket piece to the bed, the latter is first prepared by being suitably bored to the diameter of the body portion 4 and then countersunk as shown at 8 in Fig. 5 in a substantially complementary manner for the formation of the conical portion $5^a$. The socket piece is then inserted as shown in the same figure and driven home into the bed in a press or otherwise until the flanged head 3 closely abuts the one surface and the collar 7 projects from the other surface. The collar is spun or riveted over as shown in Figs. 2 and 4 on the outer surface and the bed is held securely clamped tightly between the flange thus formed by the collar and the flanged head 3. In the meantime, the spurs 6 have been driven into the body of the bed at a plurality of points to constitute a firm anchoring means that effectually prevents any twisting or turning and it will be noted that they are presented to the counter-sunk portion 8 of the bed at such an angle as to readily strike into that surface, while the material displaced thereby is accommodated within the recesses that they themselves provide from the manner of their formation with the result that a thorough interlocking of the two elements is effected. It will be recognized that the driving in of the socket piece and the spinning down of the collar 7 may readily be accomplished in one operation on a press.

As before indicated, the formation of the socket piece in Figs. 1 to 3 is that adapting it for a relatively thick bed or wall such as one made of wood, in which instance, the intermediate body portion 4 is necessarily long enough in itself to provide a sufficiently deep anchoring recess for the tripod bolt and the head 3 may consequently be flat. The other figures, however, represent the attachment for a sheet metal bed, the latter being commonly made of aluminum and other soft metals in which instance, the body portion 4 is relatively short so that a breast 9 is extended out on the head 3 to furnish the extra depth. This is not a difference material to the present invention, however, and the soft aluminum takes the spurs 6 of relatively harder material almost as readily.

I claim as my invention:

1. A tripod socket for cameras and the like comprising a flanged head adapted to bear on one side of the camera bed, an intermediate cylindrical body portion provided with a threaded recess to receive the tripod bolt, a plurality of spurs arranged laterally of the body portion in the region of its junction with the head and an annular collar at the other and open end of the body portion flush with the peripheral surface thereof and adapted to be spun or riveted over on the opposite side of the bed.

2. A tripod socket for cameras and the like comprising a flanged head adapted to bear on one side of the camera bed, an intermediate cylindrical body portion provided with a threaded recess to receive the tripod bolt, a conical portion at the junction of the body portion and head, a plurality of spurs struck up from the conical portion arranged laterally of the body portion and extending longitudinally thereof and means at the other end of the body portion adapted to be turned over against the other side of the bed.

3. The combination with a member to be supported, having a circular aperture therein provided with a countersunk portion, of a tripod socket comprising a flanged head bearing against one side of the member, an intermediate cylindrical body portion occupying the aperture in the member and provided with a threaded recess to receive the tripod bolt, a conical portion at the junction of the body portion and head lying within the countersunk portion of the aperture, a plurality of spurs struck up from the conical portion and embedded in the surface of the countersunk portion of the aperture and an annular collar at the other end of the body portion turned down against the other side of the member.

HARRY R. DARLING.

Witnesses:
 RUSSELL B. GRIFFITH,
 G. AGNESS BISSELL.